United States Patent [19]
Yoshida et al.

[11] Patent Number: 4,719,490
[45] Date of Patent: Jan. 12, 1988

[54] COLOR IMAGE PROCESSING APPARATUS

[75] Inventors: Tadashi Yoshida, Ichikawa; Naoto Kawamura, Yokohama; Tohru Takahashi, Tokyo, all of Japan

[73] Assignee: Canon Kabushiki Kaisha, Tokyo, Japan

[21] Appl. No.: 56,299

[22] Filed: Jun. 1, 1987

Related U.S. Application Data

[63] Continuation of Ser. No. 794,130, Nov. 1, 1985, abandoned.

[30] Foreign Application Priority Data

Nov. 6, 1984 [JP]    Japan .................................. 59-232291

[51] Int. Cl.[4] ............................................. G03G 15/01
[52] U.S. Cl. ..................... 355/4; 355/14 R; 355/14 C
[58] Field of Search ........................ 355/4, 14 R, 14 C

[56] References Cited

U.S. PATENT DOCUMENTS

| | | | |
|---|---|---|---|
| 4,204,728 | 5/1980 | Goshima et al. | 355/4 |
| 4,469,433 | 9/1984 | Kurata et al. | 355/4 |
| 4,479,242 | 10/1984 | Kurata | 382/17 |
| 4,518,246 | 5/1985 | Spitzner et al. | 355/4 |

Primary Examiner—A. C. Prescott
Attorney, Agent, or Firm—Fitzpatrick, Cella, Harper & Scinto

[57] ABSTRACT

A color image processing apparatus comprising an input unit which receives a plurality of color component signals in parallel. A color correction device receives the plurality of color component signals and a signals representing the kind of a corrected color signal and outputs a selected kind of corrected color signal in order to sequentially obtain different corrected color signals for respective colors from the plurality of color component signals. A color image forming device forms respective color images sequentially using the corrected color signals output from the color correction device.

10 Claims, 6 Drawing Figures

COLOR IMAGE PROCESSING APPARATUS

This application is a continuation of application Ser. No. 794,130 filed 11.1.85 now abandoned.

BACKGROUND OF THE INVENTION

1. Field of the Invention

The invention relates to color image processing apparatus which corrects a plurality of color components of an input color image signal thereby to derive a corresponding plurality of color image signals for recording, and also to color image forming apparatus which derive color hard copies from the color image signals thus obtained.

2. Description of the Prior Art

Various recording systems are used in digital image recording devices which form color images. Electrophotographic systems form respective color-decomposed potential images in corresponding color plates, develope and transfer them, and superimpose them for three colors (usually cyan, magenta and yellow) or four colors (the above three colors plus black), thereby forming a color image. Ink jet recording systems inject three or four color inks from respective nozzles corresponding to decomposed color image signals, thereby forming a color image. Thermal-sensitive transfer recording systems each perform thermal transfer of respective colors using corresponding thermal heads to form a color image. These systems are the same in that they superimpose four colors using four color (cyan(C), magenta(M), yellow(Y), or black(K)) inks or toners. In this case, since the respective actual spectral reflectance characteristics of color materials, i.e. cyan, magenta and yellow differ from the corresponding ideal ones, color decomposed data are corrected in advance using a method referred to as masking to eliminate unwanted color components mixed additionally at the printing stage in order to realize correct colors. The computation for this masking is usually performed in accordance with the following formula (1):

$$\begin{bmatrix} C' \\ M' \\ Y' \end{bmatrix} = \begin{bmatrix} \alpha_C & \beta_C & \tau_C \\ \alpha_M & \beta_M & \tau_M \\ \alpha_Y & \beta_Y & \tau_Y \end{bmatrix} \begin{bmatrix} C \\ M \\ Y \end{bmatrix} \quad (1)$$

where C, M, Y denote data on cyan, magenta and yellow before masking and C', M' and Y' denote data on after masking, and $\alpha_C - \gamma_Y$ are correction factors for masking.

In conventional color plate making and printing techniques, information generation does not require supply of a corresponding immediate printing output, so that a computer performs masking in advance. However, recently, various recording systems mentioned above allow information generation to color images to be output immediately, thereby causing hardware to perform high-speed masking. FIG. 6 shows a hardware structure for performing conventional high-speed masking. In FIG. 6, memories called look-up tables (LUTs) 6-1-6-3 store the computation results of the formula (1) therein. When these look-up tables are addressed with respective input color signals C, M and Y, output signals C', M' and Y' are immediately read. When each of input color signals C, M and Y consists of 8 bits, each of output signals C', M' and Y' usually consists of 8 bits. In this case, memory 6-1 is a 8-bit data memory which addressed with 24 bits and hence has a capacity of 16 megabytes. Furthermore, the output includes three colors, and the memory must have an enormous capacity of 48 megabytes in all. Thus the apparatus cost as well as size are increased.

SUMMARY OF THE INVENTION

It is an object of the present invention to provide a color image processing apparatus which eliminates the prior art drawbacks.

Another object of the present invention is to provide a color image processing apparatus which can obtain corrected color signals sequentially in conformity with formation of respective color images.

Still another object of the present invention is to provide a color image processing apparatus which is capable of performing a masking operation with a small-capacity memory.

These and other objects of the present invention will be apparent from the following detailed description and the attached drawings.

DETAILED DESCRIPTION OF THE PREFERRED EMBODIMENT

Now one embodiment of the present invention will be described with respect to the attached drawings.

Figure 2:
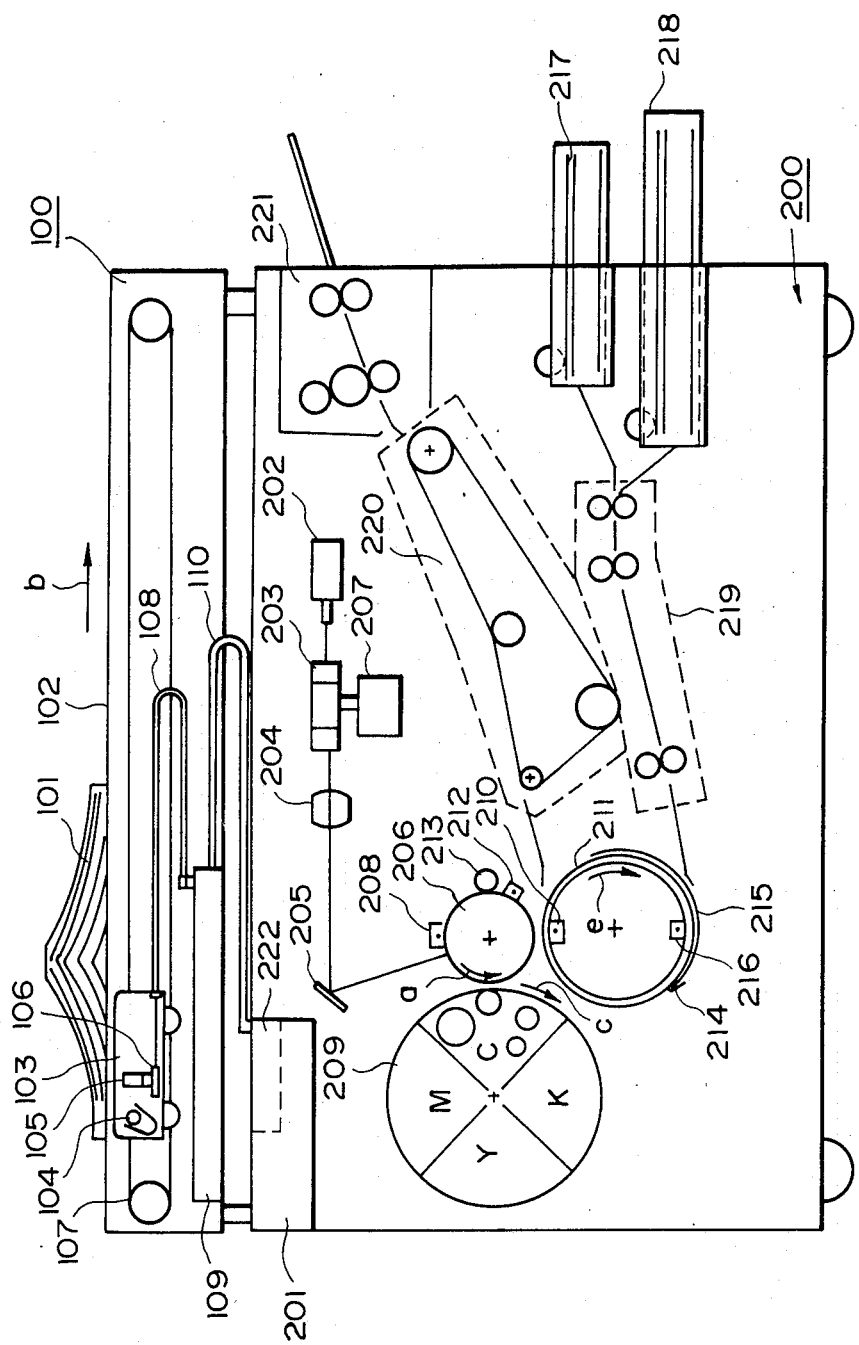
FIG. 2 is a cross-sectional view of a copying system with a color image forming apparatus which is one embodiment of the present invention.

FIG. 2 is a cross-sectional view of a copying system with a color image apparatus which is one embodiment of the present invention. In this figure, reference numeral 100 denotes a printer which decomposes an original document 101 into three primary colors Y, M and C and reads them. Reference numeral 200 denotes a printer which performs a masking operation on Y, M and C signals from the reader, furthermore produces a dark(K) signal, forms respective color plate potential images with these four colors, superimposes colors successively using an electrophotographic technique, thereby forming a color image.

The operation of the copying system will be described by going after the image signal, the color of which is decomposed or separated and read by reader 100, and the decomposed color components of which are superimposed by printer 200. An original-document reader unit 103 of reader 100 includes a halogen lamp 104 for illuminating the original document, a rod array lens 105 and a close-contact type camera sensor 106. The halogen lamp light reflected by document 101 is focused on sensor 106 through rod-array lens 105, thereby reading document 101.

Figure 3:
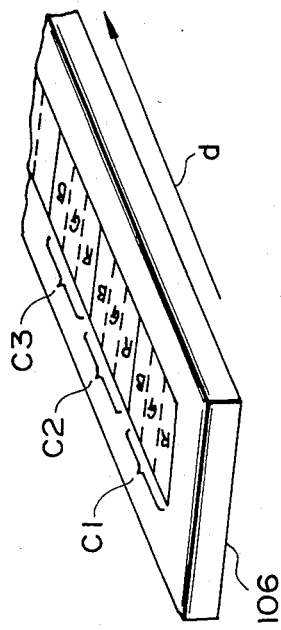
FIG. 3 is a partial enlarged perspective view of a close-contact type camera sensor.

FIG. 3 is a partial enlarged perspective view of close-contact type camera sensor 106. Sensor 106 has thereon a row of cells C1, C2, C3, ... disposed in the primary scan direction (arrow d), each of which cells reads a pixel of the image. Each cell is divided into three subcells. A first one of the subcells has a red(R) filter thereon, a second one of the subcells has a green(G) filter thereon, and a third one of the subcells has a blue(B) filter thereon. The close-contact camera sensor 106 first reads document 101 in the primary scan direction and produces image signals representing bright intensity level of R,G and B colors into which the document image is decomposed.

Again in FIG. 2, document reader unit 103 with camera sensor 106 is further scanned by an optical system drive motor 107 in the secondary direction b, thereby reading the whole document. In this way, read color-decomposed R, G and B signals are input via signal lines 108 to a CCD control unit 109 which converts the signals into three additive-color type primary colors Y, M and C signals through a complementary-color conversion, and converts the results thus obtained into digital signals. The three resulting digitized primary colors Y, M and C signals are input via signal lines 110 to an image signal processor unit 222 of printer 200 which performs a masking operation on the digitized signals, thereby deriving three corrected primary colors Y', M' and C' signals and a black signals K'.

The paticular printer requires four steps for color superimposing printing and scans the document four times, once for the step of printing each color.

Figure 4:
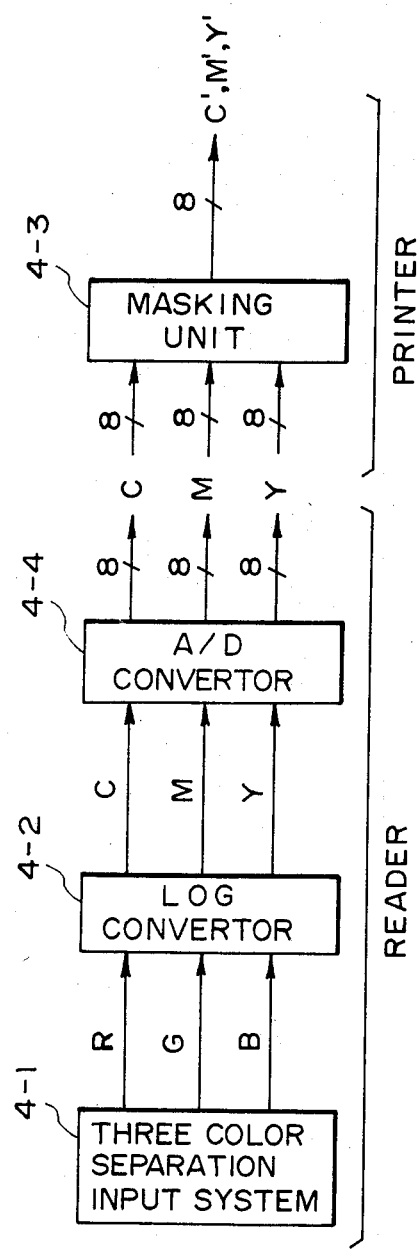
FIG. 4 is a block diagram showing the flow of transaction of an image signal.

FIG. 4 is a block diagram showing the flow of transaction of the above image signals. In FIG. 4, the R, G and B analog signals from a three-color separation input system 4-1 including camera sensor 106 are transformed logarithmically by a LOG converter 4-2 into three subtractive color type primary color signals C, M and Y proportional to the densities of the analog signals. These signals are A/D converted by an A/D converter 4-4 into corresponding 8-bit digital image signals C, M and Y. A masking unit 4-3 performs a masking operation on these digital image signals C, M and Y at the timings in conformity of the respective developing steps of the printer, thereby deriving corrected digital image signals C', M' and Y'. A UCR circuit (not shown) may be used to form a black(K') signal to provide four color image signals in all.

A printer control 201 causes a laser beam to be emitted from a laser modulator unit 202 in accordance with corrected digital image signal C'. The laser beam is modulated by a polygon mirror 203 rotated at a constant speed by a scanner motor 207 in a primary scanning, and the modulated beam is focused on a photosensitive drum 206 via F-θ lens 204 and mirror 205. Photosensitive drum 206 is in advance electrically charged uniformly by a primary charger 208. The image charges of the drum exposed by laser scan are removed. The drum 206 rotates in the direction of an arrow a and the development of color C is performed by a rotating developing unit 209. This unit 209 rotates through 90 degrees in the direction of an arrow c each time the document is scanned in the secondary direction, and selects the developing toner colors in the order of C, M, Y and K. On the other hand, a transfer sheet 215 is fed from a feed cassette 217 or 218 and wound via a carrier 219 around a transfer drum 211 by a gripper 214 on drum 211. At this time, an absorption charger 216 renders transfer sheet 215 close-contacted on drum 211. The image on photosensitive drum 206 developed into color C by developing unit 209 is first transferred onto a transfer sheet 215 by a transfer charger 210. The electric charges on the drum 206 are then eliminated by a charge eliminater 212, the toner C is cleaned by a cleaning roller 213, and thus a printing step for one color ends. In the same way, the transfer drum 211 rotates in the direction of an arrow e, whereby the steps of primary charging, exposure, development, transfer and cleaning, such as mentioned above, are performed for the remains three colors M, Y and K in order, thereby forming a superimposed-color image on transfer sheet 215. Transfer sheet 215 is released from gripper 214 and passed via carrier 220. The toner is then fixed to the transfer sheet by a fixing unit 221 to obtain a color image.

Figure 5:
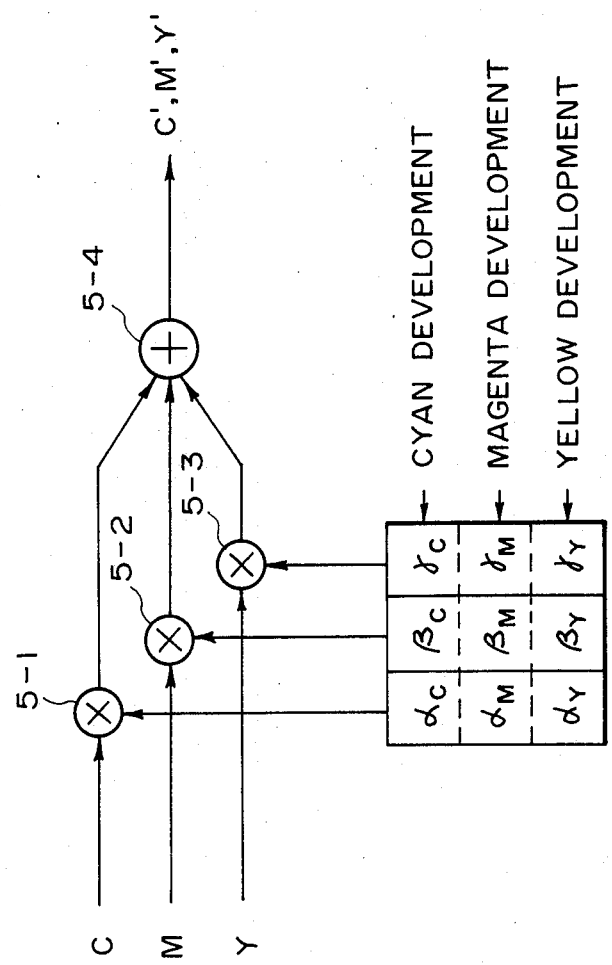
FIG. 5 illustrates the operational principle of the masking unit of FIG. 4.
Figure 6:
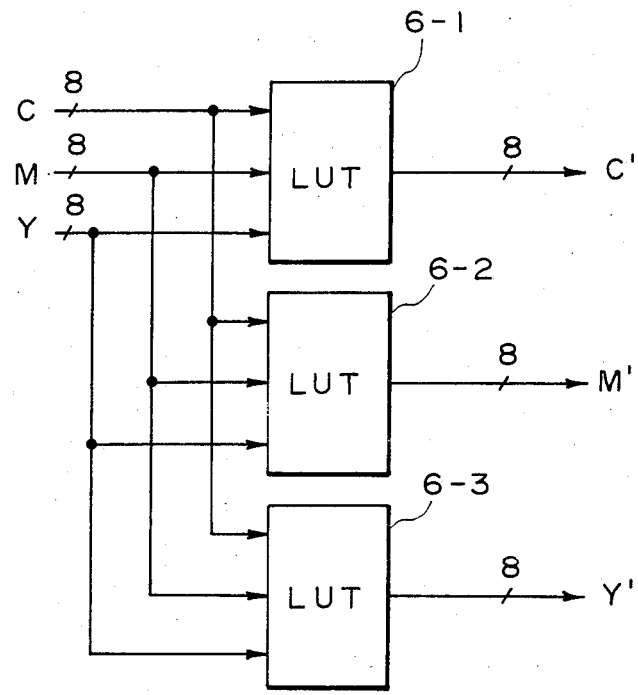
FIG. 6 illustrates the structure of hardware to perform conventional high-speed masking.

FIG. 5 illustrates the operational principle of masking unit 4-3 of FIG. 4. In the figure, reference numerals 5-1 - 5-3 are multipliers which multiply input digital image signals C, M and Y by corresponding correction factors such as showh in the formula (1). Reference numeral 5-4 denotes an adder which adds the respective results of the multiplication and selects factors, by which the input digital image signals C, M and Y are multiplied, in the order of cyan(C), magenta (M) and yellow (Y) in conformity of the developing steps of the respective colors at the printer.

Figure 1:
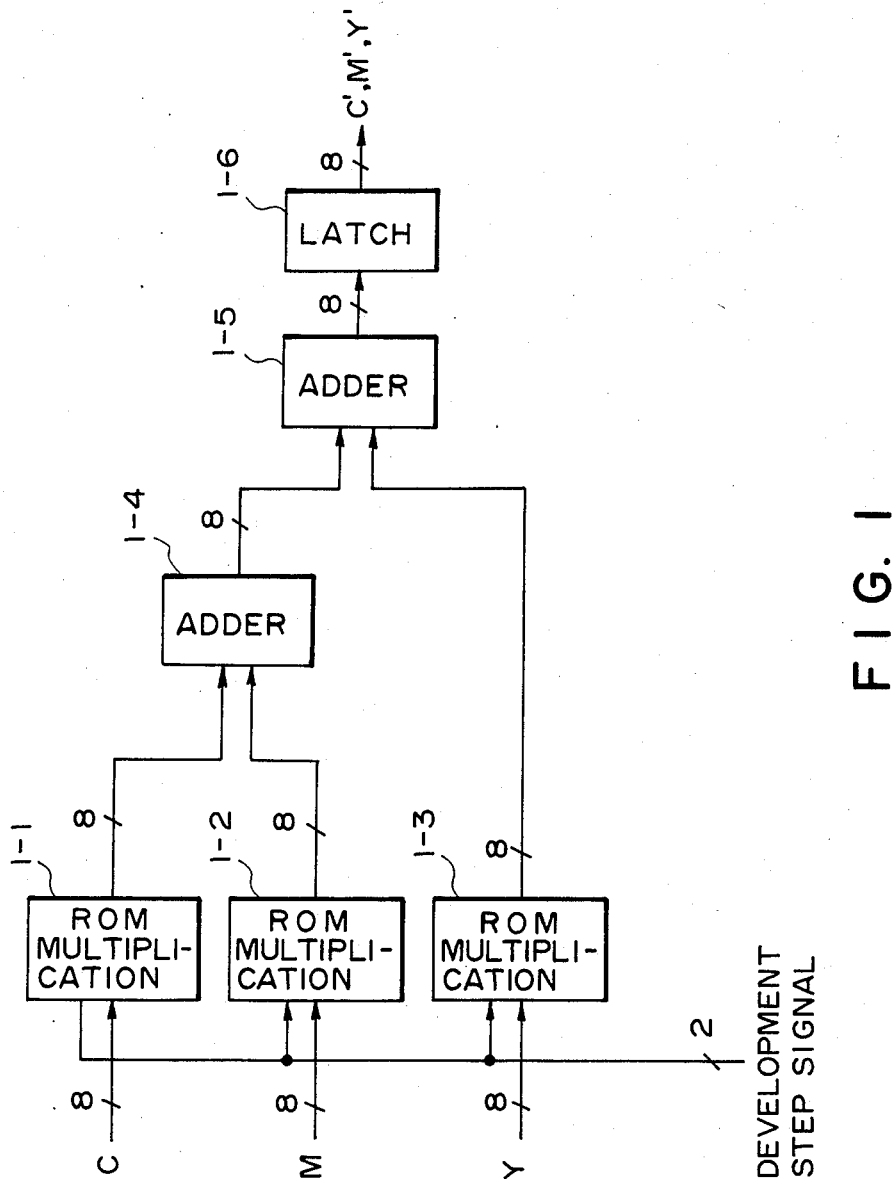
FIG. 1 is a block diagram showing the specific structure of a masking processor.

FIG. 1 is a block diagram of the specific structure of masking unit 4-3 of FIG. 4. In FIG. 1, reference numerals 1-1 - 1-3 denote multiplication ROMs which store the results of the multiplication at corresponding addresses, the corresponding address inputs of which are composed of respective input digital image signals C, M and Y factors by which the signals C, M and Y are multiplied. Reference numerals 1-4, 1-5 each denote an adder which adds the 8-bit results of the multiplication. Reference numeral 1-6 denotes a latch which latches and holds the results of the addition. A 2-bit developing step signal is given by printer controller 201 and represents the position of the rotating developing unit 209 during development of the respective colors. Eight bits of the respective input digital image signals C, M and Y are input to corresponding lower address terminals of multiplication ROMs 1-1 - 1-3. The 2-bit developing step signal given by printer controller 201 is input to higher address terminals of the respective ROMs. The developing step signal conforms to the developing step at the printer; it is for example, "00" in the cyan development, "01" the magenta development, "10" in the yellow development and "11" in the black development. A combination of two bits of each of these signals and 8 bits of each of the input digital image signals form 10-bit address signals. Storage of the results of multiplication of input digital image signals C, M and Y by the correction factors at those addresses serves to speed up computation of the respective multiplication portions of the formula (1). For example, during cyan development, the multiplication result $a_C \times C$ derived by multiplying input digital image signal C (8 lower adress bits) by a masking factor $a_C$ is stored in multiplication ROM 1-1 with two upper address bits "00". Similarly, the multiplication results $\beta_C \times M$ and $\gamma_C \times Y$ are stored in multiplication ROMs 1-2 and 1-3, respectively . These multiplication results are added at adders 1-4 and 1-5, thereby performing a masking computation such as shown in the formula (1). The results of this computation are held in latch 1-6 synchronously with a pixel clock and output printer controller 201. According to this concept, the capacity of a single multiplication ROM is 1 kilobytes; 10 address bits which are the sum of 8 lower bits (the number of bits of image data) plus two upper bits (the number of bits of the developing step signal). Thus it should be noted that while a conventional look-up table system requires 48 megabytes in total, the masking unit in the particular embodiment is constituted by memories, even the total capacities of which are 3 kilobytes, and several adders.

It should be noted that in the above embodiment, the developing step is performed for each color image. Thus selection of a correction factor is performed for each image. On the other hand, when an ink jet printer is used, respective color inks can be injected for corresponding pixels with slight time differences. Also in this case, the structure of the masking unit according to the present embodiment is usable as it is.

As described above, according to the present invention, the hardware structure for masking computation, which has required a great many of memories in the past, is extremely simplified, thereby rendering the whole system compact and inexpensive.

It should be noted that the present invention is not limited to the above embodiment and that various changes and modifications could be made within the scope of the attached claims.

What is claimed is:

1. A color image processing apparatus comprising:
    input means for receiving a plurality of color component signals in parallel;
    color correction means for receiving said plurality of color component signals and a signal representing the kind of a corrected color signal and for outputting a selected kind of corrected color signal to sequentially obtain different corrected color signals for respective colors from said plurality of color component signals, said color correction means including a plurality of multiplication means for multiplying the respective color component signals by correction factors, adder means for adding the results of the multiplication by said plurality of multiplication means and selection means for selecting said correction factors in accordance with said signal representing the kind of the corrected color signal; and
    color image forming means for forming respective color images sequentially using the corrected color signals output from said color correction means.

2. A color image processing apparatus according to claim 1, wherein said multiplication means and said selection means include a memory for storing the results of the multiplication in advance at an address represented by the values of said color component signals and said signal representing the kind of the corrected color signal.

3. A color image processing apparatus according to claim 1, wherein said image forming means forms different-colored images sequentially on an image carrier and transfers different-colored images sequentially from said image carrier to a recording material.

4. A color image processing apparatus according to claim 3, wherein said image carrier includes a photosensitive drum.

5. A color image forming apparatus for correcting color separated input image signals for respective colors and for sequentially superimposing respective color images formed by the corrected color image signals, thereby forming a composite color image, said apparatus including selection means for selection correction factors, multiplication means for multiplying said color separated input image signals by said correction factors selected by said selection means, adder means for adding the results of multiplication of the outputs of said multiplication means, color pixel forming means for forming respective color pixels in accordance with the outputs of said adder means, wherein said selection means selects the correction factors in accordance with a selection signal to select a color in which said color pixel forming means forms pixels.

6. A color image forming apparatus according to claim 5, wherein said multiplication means includes memory means storing the results of the multiplication of said input image signal by the selected correction factors at an address represented by said input image signal and said selection signal.

7. A color image forming apparatus according to claim 5, wherein said color pixel forming means includes means for forming an electrostatic potential image on an image carrier, means for developing said potential image with different color developers, and means for transferring the developed image onto a recording material.

8. A color image processing apparatus comprising:
    input means for receiving a plurality of color component signals in parallel;
    selection means for selecting correction factors for masking;
    multiplication means for multiplying said color component signals by the correction factors selected by said selection means; and
    adder means for adding the outputs of said multiplying means; wherein said selection means changes said correction factors in accordance with a selection signal to select an output color.

9. A color image processing apparatus according to claim 8, wherein said multiplication means includes memory means storing the results of the multiplication of said input image signal by the selected correction factors at an address represented by said input image signal and said selection signal.

10. A color image processing apparatus according to claim 8, further including means for sequentially forming color images for respective colors in accordance with the color signals output from said adder means.

* * * * *

UNITED STATES PATENT AND TRADEMARK OFFICE
CERTIFICATE OF CORRECTION

PATENT NO. : 4,719,490
DATED : January 12, 1988
INVENTOR(S) : TADASHI YOSHIDA, ET AL.

It is certified that error appears in the above-identified patent and that said Letters Patent is hereby corrected as shown below:

AT [57] IN THE ABSTRACT

Lines 4-5, "a signals" should read --signals--.

IN THE DRAWINGS

Sheet 3, Fig. 4, " A/D CONVERTOR " should read -- A/D CONVERTER --.
Sheet 3, Fig. 4, " LOG CONVERTOR " should read -- LOG CONVERTER --.

COLUMN 1

Line 20, "develope" should read --develop--.
Lines 43-47, "
$$\begin{bmatrix} C' \\ M' \\ Y' \end{bmatrix} = \begin{bmatrix} \alpha_C & \beta_C & \tau_C \\ \alpha_M & \beta_M & \tau_M \\ \alpha_Y & \beta_Y & \tau_Y \end{bmatrix} \begin{bmatrix} C \\ M \\ Y \end{bmatrix} \quad (1)$$
"
should read
$$--\begin{bmatrix} C' \\ M' \\ Y' \end{bmatrix} = \begin{bmatrix} \alpha_C & \beta_C & Y_C \\ \alpha_M & \beta_M & Y_M \\ \alpha_Y & \beta_Y & Y_Y \end{bmatrix} \begin{bmatrix} C \\ M \\ Y \end{bmatrix} \quad (1) --.$$

Line 49, "on" should be deleted.
Line 68, "a" should read --an--.

COLUMN 2

Line 1, "addressed" should read --is addressed--.

UNITED STATES PATENT AND TRADEMARK OFFICE
CERTIFICATE OF CORRECTION

PATENT NO. : 4,719,490
DATED : January 12, 1988
INVENTOR(S) : TADASHI YOSHIDA, ET AL.

It is certified that error appears in the above-identified patent and that said Letters Patent is hereby corrected as shown below:

COLUMN 3

Line 25, "signals" (second occurrence) should read --signal--.
Line 26, "paticular" should read --particular--.

COLUMN 4

Line 8, "remains" should read --remaining--.
Line 18, "showh" should read --shown--.
Line 67, "1 kilobytes;" should read --1 kilobyte;--.

Signed and Sealed this

Twenty-eighth Day of June, 1988

Attest:

DONALD J. QUIGG

*Attesting Officer*   *Commissioner of Patents and Trademarks*